Feb. 10, 1931.  E. F. NORTHRUP  1,791,934
INDUCTION HEATING
Filed Dec. 21, 1925   3 Sheets-Sheet 1
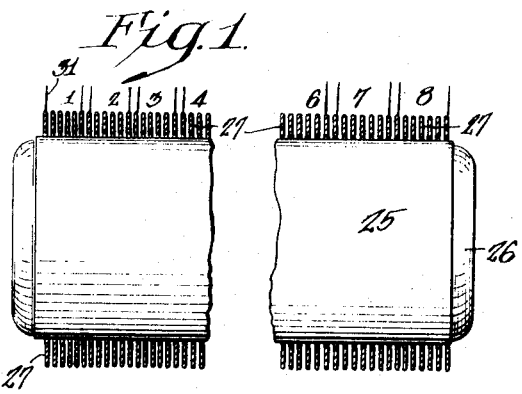
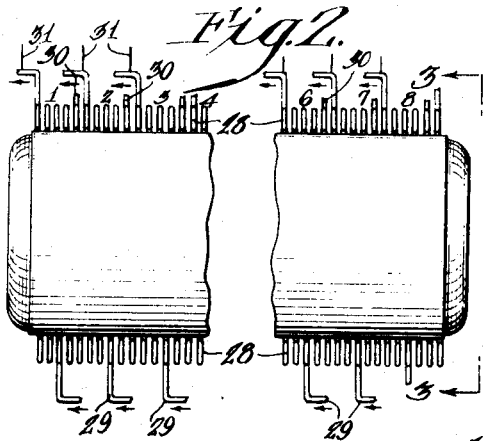
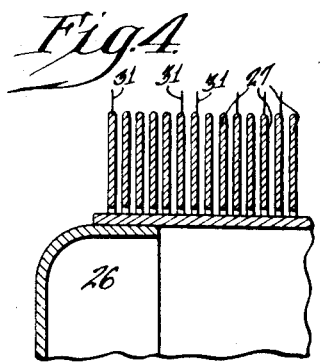
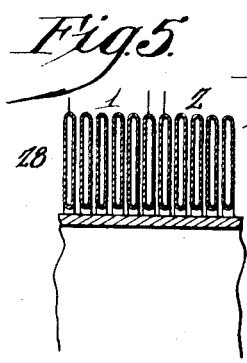
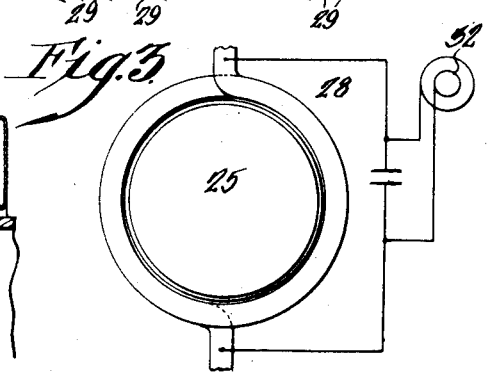
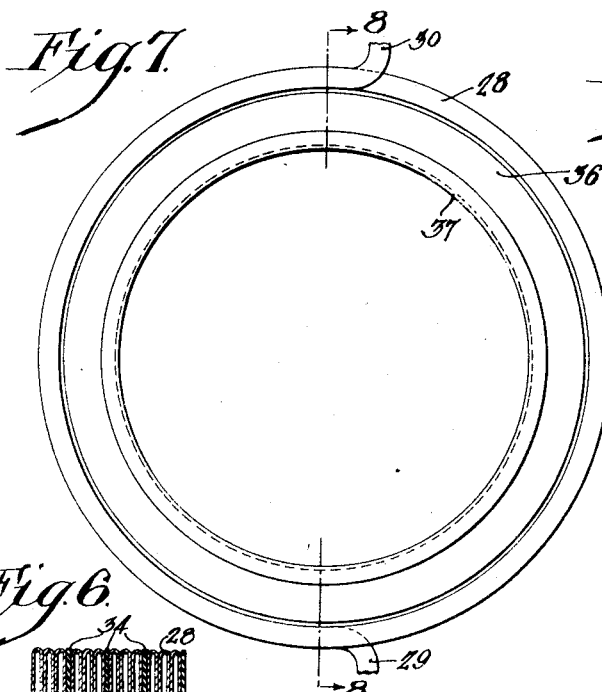
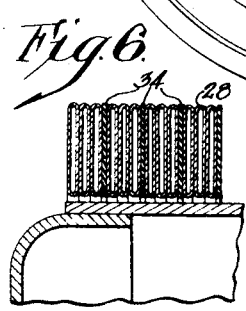
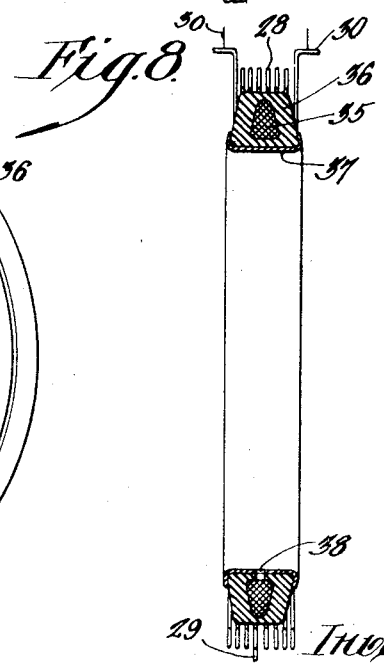
Inventor
Edwin F. Northrup
by
Attorney Feb. 10, 1931.  E. F. NORTHRUP  1,791,934
INDUCTION HEATING
Filed Dec. 21, 1925  3 Sheets-Sheet 2
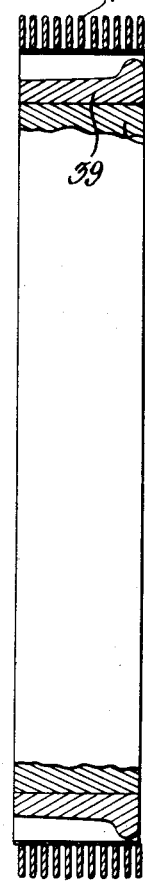
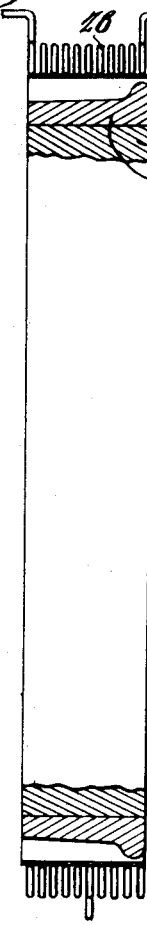
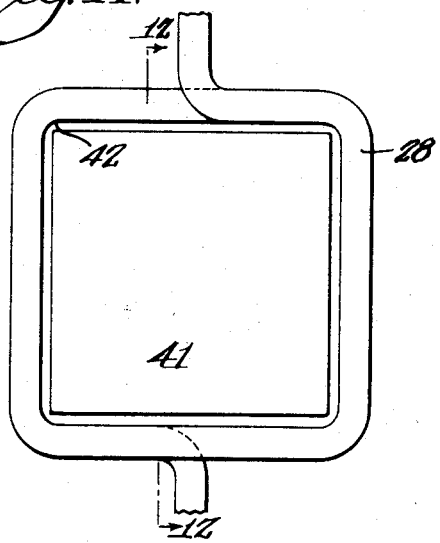
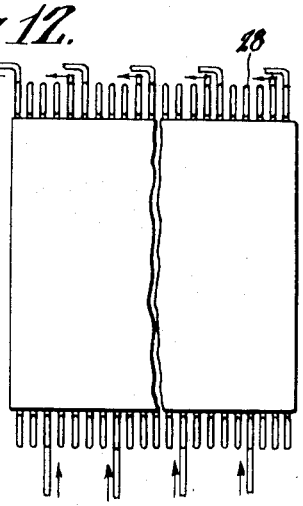
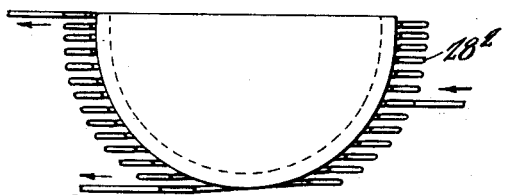
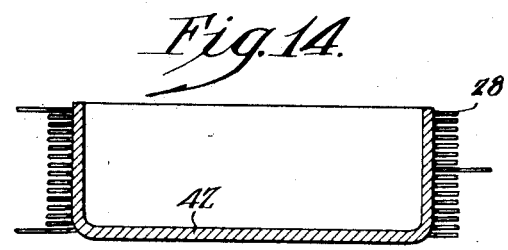
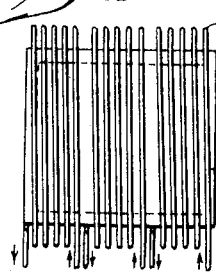
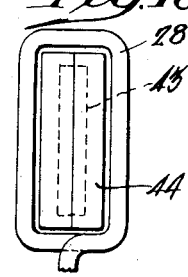
Inventor
Edwin F. Northrup.
by W. Steell Jackson
Attorney.

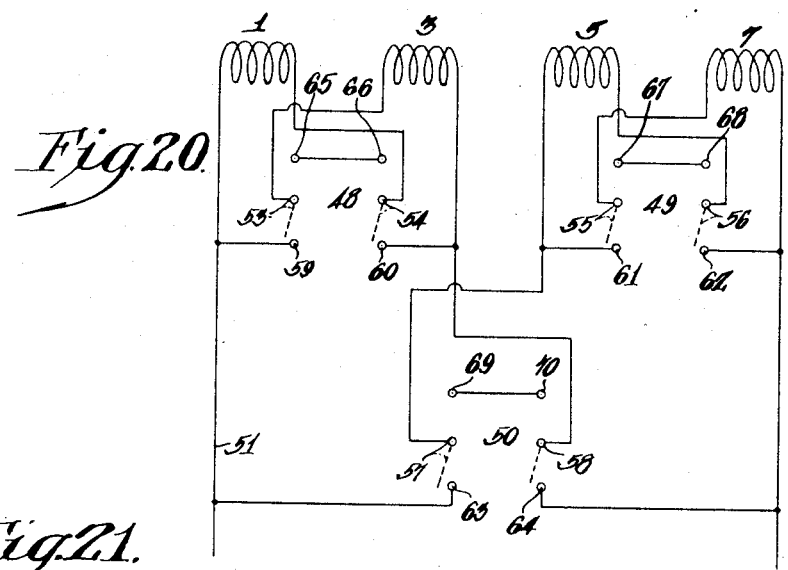
Fig.20.
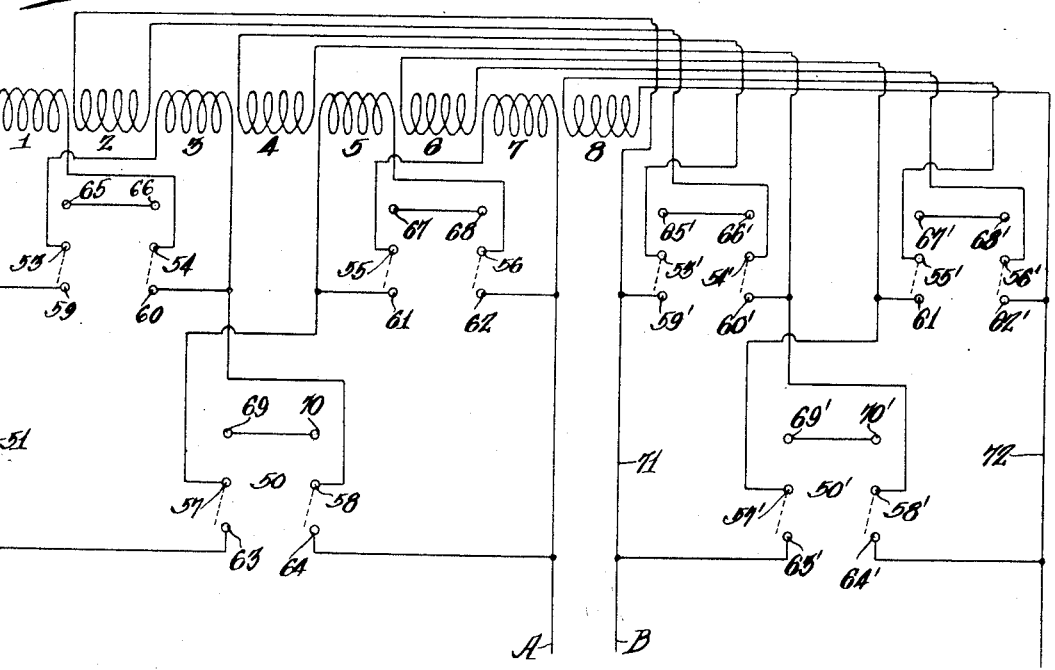
Fig.21.
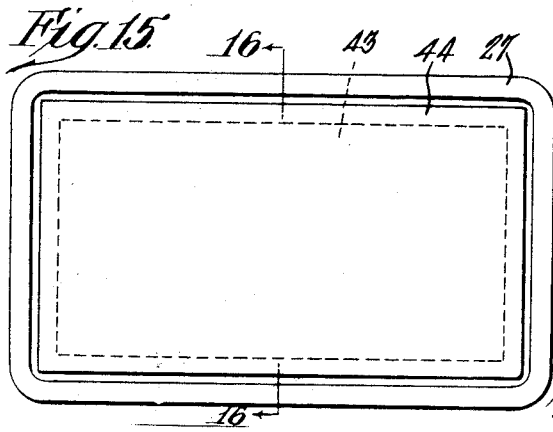
Fig.15.
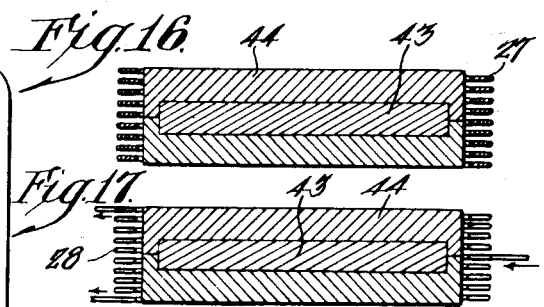
Fig.16.
Fig.17.
Inventor: Edwin F. Northrup Patented Feb. 10, 1931

1,791,934

UNITED STATES PATENT OFFICE

EDWIN F. NORTHRUP, OF NEAR PRINCETON, NEW JERSEY, ASSIGNOR TO AJAX ELECTROTHERMIC CORPORATION, OF TRENTON, NEW JERSEY, A CORPORATION OF NEW JERSEY

INDUCTION HEATING

Application filed December 21, 1925. Serial No. 76,879.

My invention relates to the heating by induction coils surrounding the objects heated.

A purpose of my invention is to conform the inductor generally to the shape of an irregular object.

A further purpose is to heat tubular objects of iron or steel of non-magnetic metals such as drums by edge wound coils surrounding them.

A further purpose is to provide an inductor, with or without water cooling, subdivided into sections through all of which the current may be passed to secure different rates of heating because of differences of current flow through each coil, preferably through series, parallel and series-parallel groupings. This inductor is adapted to multi-phase supply.

A further purpose is to provide for division of inductor coils fed from multi-phase supply, interspersing coils from one phase with coils from another and to use all of the coils in different groupings to vary the heating rate.

A further purpose is to group a plurality of coils or sections of coils for series and series-parallel operation.

A further purpose is to conform the shape of inductor coils to the shape of non-circular objects which they surround.

A further purpose is to apply a rectangular or square coil to structures of rectangular or square outline.

A further purpose is to apply low frequency inductive heating without necessity for transformer iron interlinkage to the melting out of low melting point cores from within automobile tires.

Further purposes will appear in the specification and in the claims.

Figure 1 is a broken elevation, partly in section, showing one form of my invention applied to an iron or steel drum, fixed or rotatable.

Figure 2 is a broken elevation partly in section showing a second form of my invention also applied to a fixed or rotatable drum.

Figure 3 is an end elevation of Figure 2 looking in the direction of the arrow but adding a source of current supply.

Figures 4 and 5 are fragmentary enlarged sections of the structures of Figures 1 and 2 respectively.

Figure 6 is a fragmentary section showing a modification of the winding shown in Figure 5.

Figures 7 and 8 are a side elevation and a section upon line 8—8 thereof, showing my invention applied to a vehicle tire in process of manufacture.

Figures 9 and 10 are central longitudinal sections showing my invention applied with slightly different windings to a locomotive tire.

Figures 11 and 12 are an end elevation and a section upon line 12—12 thereof showing application to a charge of a square cross section which may differ as widely as a drum— and solid metal, for example.

Figure 13 is a section partly in elevation showing my invention applied to the winding of a hemi-spherical container in zones.

Figure 14 is a central vertical section showing application of my invention to shallow cylindrical container.

Figures 15 and 16 are a top plan view and a section upon 16—16 thereof showing a metal slab to be heat treated.

Figure 17 is a section corresponding to Figure 16 showing a slightly different winding.

Figures 18 and 19 are a side elevation and a top plan view respectively showing application of separate heating inductors to a slab under heat treatment.

Figures 20 and 21 are diagrammatic views showing means of connecting inductor coils in series, parallel and series-parallel.

In the drawings similar numerals indicate like parts.

Describing first the construction seen in Figures 1 to 5:—

I show a drum 25 which may be of iron or other magnetic material or which may be wholly non-magnetic where the content is to be heated directly. Where magnetic it is suitable, for example, for heat treating oils, PbO to be changed to $Pb_2O_3$ and many other chemicals, etc. The construction showing the mode of attachment of the head 26 to the drum is casual and has no part in my invention.

I very much prefer to use edgewise wound flattened conductors in all of these constructions and show two forms of such windings, one solid at 27 in Figures 1 and 4 and the other hollow at 28 for water cooling, shown in Figures 2, 3 and 5.

In the water cooled figures I show taps 29 at which water may be inserted and outlets 30 where the water may be discharged, permitting convenient electrical connection at the same points if desired in accordance with a different feature of my invention.

For application of my series, and series-parallel connections, where desired, I show points of current attachment 31 at intervals in both the solid and water-cooled forms, though it is evident that even if the entire length of each inductor were wound in a single coil, as viewed from electrical standpoint, the disclosure would come within other features of my invention.

Where the drum is of magnetic material it is permissible to use a frequency very much lower than where the material is non-magnetic, as the interlinkage will be much improved and sufficient energy can be transferred to the secondary (drum) circuit without the need of the high rate of change given by higher frequency. Where non-magnetic material is used for the drum it is desirable that the frequency be relatively high.

In either case I contemplate correcting the power factor of the circuit from generator 32 about the container 25 by condensers as shown diagrammatically in Figure 3.

In the form shown in Figure 6 I form each turn 28 of the inductor of a plurality of flattened tubes edgewise wound, which need not be insulated from each other but are insulated between the turns at 33. The cooling water is passed through the hollow conductors of the same turn in parallel and these parallel conductor turns may be in series or in parallel. They may be arranged in groups or single turns as is illustrated diagrammatically in Figure 2.

The electrical conductors within each turn and in groups as well as the corresponding water connections can be operated in parallel.

In Figures 7 and 8 I have applied my invention to the melting of a low fusing point electrically conducting core 35 used within the rubber tire section 36 mounted upon the metal rim 37 during manufacture of the rubber tire so as to cause the metal to flow out from opening 38. The final residuum of molten metal that will not flow out can be withdrawn by suction as described by me in my application, Serial No. 651,398, of which this is in part a continuation. The edge wound flattened tubing 28 in this case is preferably provided with electrical connections at the terminals only, and the conductor is water-cooled through inlet 29 and two outlets 30—or the reverse—as preferred. As the depth is considerable a relatively low frequency can be used.

In Figures 9 and 10 I apply the invention to the heating of tires 39 for locomotive driving wheels. The frequency should be such that depth of penetration will not be greater than the thickness of the tire as determined by the formula $$N = \frac{25 \times 10^6 \times \rho}{\mu \times l_p^2}$$

in which N is the frequency, $\rho$ the resistivity of the metal heated, $\mu$ the permeability of the metal and $l_p$ the "depth of penetration", which equals approximately one-third the distance to which the induced energy extends effectively. I can use the same arrangement for heating shrunken bands and outer shells or rings in widely different applications in which I select such a frequency that the heating induction does not extend beyond the ring or shell and heat up the rings and shells (including the shells shrunk on larger caliber and high powered guns) so quickly that there is no time for the ring or shell to communicate much heat to the adjoining metal, with the result that I can remove these tires, rings and shells to great advantage from any rims or mounts 40 to which they may be attached.

In Figures 11, 12 and 15 to 19 my invention is applied to charges having irregular shapes such as triangular, rectangular, square, etc. In Figures 11 and 12 is shown a drum or container 41 of square section which is surrounded by a square coil of edgewise wound flattened tubing 28 having substantially square corners 42.

The winding is here shown as water-cooled with multiple water flow but may evidently be solid. As shown, the current can be applied in series or in multiple or in series multiple with control over them such as is explained in connection with Figure 20 except that the coils would not be spaced as in that figure unless there were to be intervening coils belonging to another part of the system as in Figure 21.

It will be obvious that splitting up the winding into separate coils as in Figures 1, 2, 4, 5, 11 and 12 and supplying these coils in series, parallel or series-parallel is a special feature of my invention of which advantage will not be needed nor sought in all cases, particularly where the coil covered length is relatively short, and that in all of these figures the system may be designed to follow the normal course in having the entire inductor, or any large part of it, in a single coil which is permanently connected. Certain features of my invention are in no way dependent upon the character of coil connection, whether in a single length or in a plurality of sections with means for connecting sections up as desired. From these claims I have omitted reference to the splitting up of the inductor into sections as well as to the series, parallel or series-parallel connection.

In all of these forms—as in subsequent forms—the frequency to be selected will depend in large measure upon the power factor correction intended as well as on desired depth of penetration. Not only should the frequency be high enough so that the energy induced will not appreciably pass beyond the inside of the shell but it must be high enough for economical power factor correction. The magnetic or non-magnetic character of material will considerably affect the depth of penetration.

With the use of condensers power factor correction will cost about nine times as much for 60 cycle current supply, for example, as for a supply at 540 cycles, at which latter the rate of change will be nine times as great. On the other hand as the frequency increases the difficulty of securing alternators to generate it directly economically increases though at that frequency alternators of standard multi-polar rotary type are now available.

In considering the question of high frequency supply the use of static frequency changers must be kept in mind.

In Figure 13 a hemispherical crucible is heated by solid or water-cooled coils which progressively reduce in diameter as shown.

In the form shown in Figure 14 the coil 28 surrounds a shallow crucible 42 and is water-cooled, the water flowing through multiple paths.

The forms shown in Figures 15, 16 and 17 are alike except that edge-wound coil 27 about the edge of the charge in Figure 16 is of solid strap whereas the coil 28 is water-cooled with multiple paths of flow in Figure 17.

In each of these forms a slab 43, of high carbon steel, for example, is shown under heat treatment and is heated to a high temperature in an enclosure of graphite 44, for the ultimate purpose of surface hardening the slab. The coils are rectangular, conforming to the shape of the slab and as close to it as the necessary heat and electrical insulation and the intervening of the graphite will permit.

In the forms shown in Figures 18 and 19 the same slab 43 surrounded by graphite 44 is illustrated as in Figures 15, 16 and 17, but in this case the coils are wound transversely around the slab rather than edgewise of the slab, again conforming as closely to the shape of the slab as possible.

The coils 45, 46 and 47 are here separate and distinct in order that it may be possible to supply them from separate sources of current if desired. Different phases of the same current may be used, and series, parallel, or series-parallel connections to them may be made. The same separability of the coils, is, of course, permissible in all of the other forms where the coil length is sufficient to make it worth while.

In Figures 20 and 21 the application of single phase and two-phase series, parallel, and series-parallel connections is shown, whereby any coil of sufficient length to make it worth while can be split up into sections which are connected in series, or parallel at will and in which, if the sections be more than two, the current can be passed through the coils in groupings of series parallel. Interspersing sections of winding included in one circuit between or among sections included in a separate circuit, as in the case of different phases of the same alternating current supply distributes the current from each circuit uniformly along the length of the inductor and would result in uniform distribution of what current there was along the inductor even if the current from one phase were interrupted. Since with each series, parallel, or series-parallel grouping, all the inductor coils are intended to carry the same current, the interspersement of coils as intended is not vital but would become important if the coils be used to induce current in the content and the content included within above coils be different. This interspersing of the sections of coils from different circuits is therefore desirable though not essential. It makes it possible to reduce the energization below that given by complete series grouping by including the interspersed sections from one circuit only while giving general distribution of the coils along the length of the drum or other container or article which is being heated.

For convenience in application of the illustration of Figure 20 to the structure shown in Figures 1 and 2 I have marked the coils with numbers corresponding in the two cases.

The coils 1, 3, 5 and 7 represent four disconnected parts of a winding which are coaxial and all of which may apply to the same electric furnace.

They will more usually be applied to the same heating equipment other than a furnace, for example, for the heating of iron or steel pipes, bars or rods, or of blooms, billets, etc., or of drums in which processes are being carried out or of the contents of such drums.

The material to be acted upon may be stationary or movable during the time it is being heated or heat-treated.

The coils 1, 3, 5 and 7 in the illustration may be adjoining coils where single phase supply is used but are shown as physically spaced from each other for the reason chiefly that this spacing makes a little clearer the combination of this structure and wiring in Figure 20 with another structure and circuit or structures and circuits involving one or more sources of current supply or phases. The spaces between corresponding coils 1, 3, 5 and 7 may be occupied by the coils 2, 4, 6 and 8 of another phase, for example, as in Figure 21. For some purposes it is desirable to space such coils as 1, 2, 3 and 4 even when other coils are not interspersed to evenly distribute heat along a considerable length.

The coils or windings 1, 3, 5 and 7 are connected through double pole, double throw switches 48, 49 and 50 with an alternating current line 51, 52 connected to one end each of coils 1 and 7.

The switch knives 53 and 54 of switch 48 are connected with the ends nearest to each other of coils 1 and 3 and the switch knives 55 and 56 are connected with the ends nearest each other of coils 5 and 7. The knives 57 and 58 of switch 50 are connected with the ends nearest to each other of coils 3 and 5.

The ends of coils 1 and 3 farthest from each other are connected with switch contacts 59 and 60, and the ends farthest from each other of coils 5 and 7 are connected with switch contacts 61 and 62 of switch 49. The ends farthest from each other of coils 1 and 7 (corresponding with the line wires) are connected with switch contacts 63 and 64 of switch 50. If the switch knives be closed in all three switches against the contacts named it will be seen that current from line 51 will be connected directly with coil 1, through switch plate 53 with coil 3, through switch plate 57 directly with coil 5 and through switch plate 57 with coil 7 through switch plate 55, the other ends of these coils being correspondingly connected with the line 52 either directly or through the other switch plates.

As a result all of the coils 1, 3, 5 and 7 are in parallel.

The opposite pairs of contacts 65, 66, 67, 68, 69 and 70 are joined together within each pair with the result that throwing the knives of switch 48, for example, to engage contact 65 and 66 will place the coils 1 and 3 in series instead of in parallel. Likewise throwing the knives of the switch 49 to engage contact 67 and 68 will throw coils 5 and 7 in series and when knives 57 and 58 of the switch 50 engage contacts 69 and 70 the circuits including coils 1 and 3 and 5 and 7 respectively will be thrown in series (whether the coils of the pair be in series or in parallel).

If the knives of switches 48 and 49 be closed with contacts 59 and 60, 61 and 62 and the switches 57 and 58 be closed with contacts 69 and 70, coils 1 and 3 in parallel will be placed in series with coils 5 and 7 in parallel. On the other hand if all of these switches be reversed, coils 1 and 3 in series will be placed in parallel with coils 5 and 7 in series affording two combinations of series parallel connections.

If new coils 2, 4, 6 and 8 of a system identical with that shown in Figure 20 be interspersed with coils 1, 3, 5 and 7 and be connected with a different source of supply, either one set of four coils or the other can be energized without energizing the other set affording additional control of the amount of energy applied to the charge. I have shown in Figure 21 at the left the connections of Figure 19 supplying coils 1, 3, 5 and 7 and have interspersed between them coils 2, 4, 6 and 8 of a duplicate system whose switches and contacts shown at the right of the figure bear numbers corresponding with the numbers of these parts in Figure 20, but using primes to distinguish. This second system is supplied from a line 71, 72 which may be a wholly independent source of supply but which will normally be the other phase of a two-phase circuit.

With no more change than the addition of a third unit interspersed between the coils of the other units, the system becomes a three-phase system. In it, for example, coils 1, 3, 5 and 7 of Figure 20 become coils 1, 4, 7 and 10 and the new system coils 2, 4, 6 and 8 become coils 2, 5, 8 and 11 and the coils of the three-phase become coils 3, 6, 9 and 12.

It is well to point out here that so long as the current from the different phases is maintained and the charge, container or content inductively acted upon is the same in all the coils, there is no advantage in interspersing the coils and each phase or current supply can take care of a separate section of the furnace or heater.

It will be obvious that with my disclosure herein forms and changes will occur to others skilled in the art suiting special needs or individual whim or designed merely to avoid copying my form and securing all or a part of the benefit of my invention. It is my purpose to include herein all such as come within the reasonable spirit and scope of my invention.

Having thus described my invention, what I claim as new and desire to secure by Letters Patent is:

1. In inductive heating, a drum having a shell of magnetic material and adapted to contain a content to be heat-treated, in combination with an edgewise wound inductor surrounding substantially the length of the drum, a source of alternating current for the inductor, power-factor correction for the current and connections whereby the electric current is selectively passed through sections of the coil in series or in parallel to uniformly heat the portion of the drum surrounded to different temperatures.

2. In inductive heating, a drum having a shell of magnetic material and adapted to contain a content to be heat-treated, in combination with an edgewise wound inductor surrounding substantially the length of the drum, power-factor correction for the current and connections whereby the electric current is selectively passed through sections of the coil in series or in parallel or series-parallel.

3. In inductive heating, a horizontal drum having a shell of magnetic material adapted to contain a content to be heat-treated, in combination with an inductor surrounding substantially the length of the drum, connections for sending the current through different parts of the inductor in series or parallel at will, and power factor correction for the current.

4. A charge, a magnetic shell about the charge, a winding about the charge divided into sections, a source of alternating current and connections whereby the current is passed through the several sections selectively in series or in parallel.

5. A charge, a horizontally disposed magnetic shell surrounding the charge, a winding about the shell divided into sections, a source of alternating current, connections whereby the current is passed through the several sections selectively in series or in parallel, or in series-parallel, and power-factor correction for the current.

6. In a heating system, a plurality of inductor coils surrounding a charge to be heated, in combination with multiphase alternating current supply for said coils, the coils of one phase interspersed between the coils of another phase and connections for placing the different coils of each phase in series or in parallel, to include all of the coils in each connection.

7. In a heating system, a plurality of inductor coils surrounding a charge to be heated, in combination with multiphase alternating current supply for said coils, the coils of one phase interspersed between the coils of another phase and connections for placing the different coils of each phase in series or in parallel or in series parallel to include all of the coils in each connection.

8. In an induction heating system, a multiphase source of alterating current supply, a plurality of spaced inductor coils supplied by each phase, those of one phase being interspersed between those of another phase and connections for throwing the coils normally supplied by one phase at will in series with or in parallel with the coils normally supplied by the other phase.

9. The process of heating from different phases or sources of electrical energy passed through an inductor which consists of splitting the inductor up into a number of sections greater than the number of phases, and of which the number of sources of phases is an aliquot part and applying the current to the sections so as to intersperse the current from one phase among or between the applications of current from another phase.

10. The process of uniformly heating a secondary or a coreless inductor to different extents from the same voltage of supply which consist in dividing the current to pass through the different belts of the inductor in series one with another or in parallel to use the same breadth of inductor winding with different currents.

EDWIN F. NORTHRUP.